US012265997B2

(12) United States Patent
Strayer et al.

(10) Patent No.: US 12,265,997 B2
(45) Date of Patent: Apr. 1, 2025

(54) SYSTEMS AND METHODS FOR USER ENGAGEMENT WITH A RETAILER (71) Applicant: Walmart Apollo, LLC, Bentonville, AR (US)

(72) Inventors: Mark J. Strayer, Rockford, MI (US); Johan B. Rundberg, Oakland, CA (US); Benjamin T. Ford, Redmond, OR (US)

(73) Assignee: Walmart Apollo, LLC, Bentonville, AR (US)

( * ) Notice: Subject to any disclaimer, the term of this patent is extended or adjusted under 35 U.S.C. 154(b) by 342 days.

(21) Appl. No.: 17/729,936

(22) Filed: Apr. 26, 2022

(65) Prior Publication Data
US 2022/0343375 A1 Oct. 27, 2022

Related U.S. Application Data (60) Provisional application No. 63/179,932, filed on Apr. 26, 2021.

(51) Int. Cl.
G06Q 30/02 (2023.01)
G06Q 30/0601 (2023.01)
(Continued)

(52) U.S. Cl.
CPC ..... G06Q 30/0281 (2013.01); G06Q 30/0635 (2013.01); G06Q 30/0641 (2013.01);
(Continued)

(58) Field of Classification Search
CPC .............. G06Q 30/0635; G06Q 30/0641
See application file for complete search history.

(56) References Cited

U.S. PATENT DOCUMENTS 9,449,343 B2 9/2016 Mayerle
10,402,776 B2 * 9/2019 Grabovski ............. G06Q 20/10
(Continued)

FOREIGN PATENT DOCUMENTS

WO 2013163103 A1 10/2013

OTHER PUBLICATIONS

Kohl's propels omnichannel, digital strategy to make shopping easier than ever. Retail Customer Experience. News Features [Louisville] Sep. 29, 2015. (Year: 2015).*
(Continued)

Primary Examiner — Michael Misiaszek
(74) Attorney, Agent, or Firm — Foley IP Law, PLLC (57) ABSTRACT In some embodiments, apparatuses and methods are provided herein useful for user engagement with a retailer. In some embodiments, a system includes an application including a set of computer program code configured to be executed by a mobile electronic device associated with a customer of the retailer. The application includes a first component and a second component. A first server includes a first control circuit and communicatively coupled to the application and configured to: communicate with the first component. A second server includes a second control circuit and communicatively coupled to the application and configured to: facilitate purchase of products for sale at an ecommerce website; and switch, upon an activation of the second component, control by the first server of a first user interface provided by the first component to control by the second server of the second user interface provided by the second component.

16 Claims, 10 Drawing Sheets

(51) Int. Cl.
*G06K 7/14* (2006.01)
*G06Q 10/083* (2024.01)
*G06Q 20/32* (2012.01)

(52) U.S. Cl.
CPC ......... *G06K 7/1417* (2013.01); *G06Q 10/083* (2013.01); *G06Q 20/3276* (2013.01)

(56) References Cited

U.S. PATENT DOCUMENTS

| | | | | |
|---|---|---|---|---|
| 2012/0158482 A1* | 6/2012 | Paradise | ............ | G06Q 30/0623 705/26.61 |
| 2013/0198039 A1 | 8/2013 | Sridharan | | |
| 2014/0188601 A1 | 7/2014 | Buset | | |
| 2014/0236775 A1* | 8/2014 | Gill | .................... | G06Q 30/0643 705/27.2 |
| 2014/0344109 A1* | 11/2014 | Prindle | .............. | G06Q 30/0633 705/26.8 |
| 2019/0320287 A1* | 10/2019 | Weiss | ................ | G06Q 30/0601 |
| 2020/0065841 A1* | 2/2020 | Hernandez | ............. | G06Q 50/01 |
| 2022/0318893 A1* | 10/2022 | Lau | ................... | G06Q 30/0633 |

OTHER PUBLICATIONS

I shopped at Walmart using the 'Scan & Go' feature on its mobile app, and I didn't have to interact with a single person in the store Chen, Connie. Business Insider, US edition [New York] Feb. 24, 2021. (Year: 2021).*

Digimarc Demonstrates "Scan & Scale" at NRF 2019: From augmented reality to fast checkout options to GMO disclosures, Digimarc Barcode gains adoption by world's largest retailers and consumer brands PR Newswire [New York] Jan. 10, 2019. (Year: 2019).*

Pure Oxygen Labs; "How to Create a QR Code that Deep Links to Your Mobile App"; <https://pureoxygenlabs.com/how-to-create-a-qr-codes-that-deep-link-to-your-mobile-app/> ; Oct. 31, 2017; 19 pages.

* cited by examiner

SYSTEMS AND METHODS FOR USER ENGAGEMENT WITH A RETAILER

CROSS-REFERENCE TO RELATED APPLICATION(S)

This application claims the benefit of U.S. Provisional Application No. 63/179,932 filed Apr. 26, 2021, which is incorporated herein by reference in its entirety.

TECHNICAL FIELD

This invention relates generally to user engagement with a retailer, and more specifically is directed to user engagement with a retailer via a mobile user device.

BACKGROUND

Generally, a customer uses an application to shop in person at a store and a different application to shop online. However, it is quite inconvenient and time consuming for the customer to switch or jump between these applications depending on whether the customer wants to purchase an item at the store/in person or online.

BRIEF DESCRIPTION OF THE DRAWINGS

Disclosed herein are embodiments of systems, apparatuses and methods pertaining to user engagement with a retailer. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for user engagement with a retailer. In some embodiments, a system for user engagement with a retailer includes an application including a set of computer program code configured to be executed by a mobile electronic device associated with a customer of the retailer. The application includes a first component and a second component. In some embodiments, when executed by the mobile electronic device, the first component activates functionality of the first component responsive to a user input and upon a determination that the mobile electronic device is at a retail store. The first component provides a first user interface for interaction with the customer on the mobile electronic device. In some embodiments, the first component receives product identifying information of one or more products physically located at the retail store and that the customer intends to purchase and take possession thereof when exiting the retail store. The first component may compile a virtual cart of the one or more products based on the product identifying information to purchase at the retail store. The first component may receive data associated with a machine-readable label corresponding to a product for sale in the retail store that the customer is interested in purchasing. In some embodiments, the data corresponds to activation of the second component and corresponds to the product for sale. The machine-readable label is optically read by an image capture device of the mobile electronic device. In some embodiments, when executed by the mobile electronic device, the second component activates functionality of the second component upon the receipt of the data. The second component may provide a second user interface for interaction with the customer on the mobile electronic device. In some embodiments, the system includes a first server including a first control circuit and communicatively coupled to the application. The first server may communicate with the first component, receives data corresponding to the virtual cart of the one or more products, and/or facilitates electronic payment for the one or more products of the virtual cart. In some embodiments, the system includes a second server including a second control circuit and communicatively coupled to the application. The second server may facilitate purchase of products for sale at an ecommerce web site. The second server switches, upon the activation of the second component, control by the first server of the first user interface provided by the first component to control by the second server of the second user interface provided by the second component.

In some embodiments, a method for user engagement with a retailer includes activating, by a first component of an application comprising a set of computer program code configured to be executed by a mobile electronic device associated with a customer of the retailer, functionality of the first component responsive to a user input and upon a determination that the mobile electronic device is at a retail store. The method includes providing, by the first component, a first user interface for interaction with the customer on the mobile electronic device. In some embodiments, the method includes receiving, by the first component, product identifying information of one or more products physically located at the retail store and that the customer intends to purchase and take possession thereof when exiting the retail store. By one approach, the method may include compiling, by the first component, a virtual cart of the one or more products based on the product identifying information to purchase at the retail store. In some embodiments, the method includes receiving, by the first component, data associated with a machine-readable label corresponding to a product for sale in the retail store that the customer is interested in purchasing. For example, the data may correspond to activation of the second component and corresponds to the product for sale. A machine-readable label may be optically read by an image capture device of the mobile electronic device. The method may include activating, by a second component of the application, functionality of the second component upon the receipt of the data. In some embodiments, the method includes providing, by the second component, a second user interface for interaction with the customer on the mobile electronic device. The method includes communicating, by a first server comprising a first control circuit and communicatively coupled to the application, with the first component. In some embodiments, the method includes receiving, by the first server, data corresponding to the virtual cart of the one or more products. The method may include facilitating, by the first server, electronic payment for the one or more products of the virtual cart. The method includes facilitating, by a second server including a second control circuit and communicatively coupled to the application, purchase of products for sale at an ecommerce website. In some embodiments, the method includes switching, by the second server and upon the activation of the second component, control by the first server of the first user interface provided by the first component to control by the second server of the second user interface provided by the second component.

Figure 1:
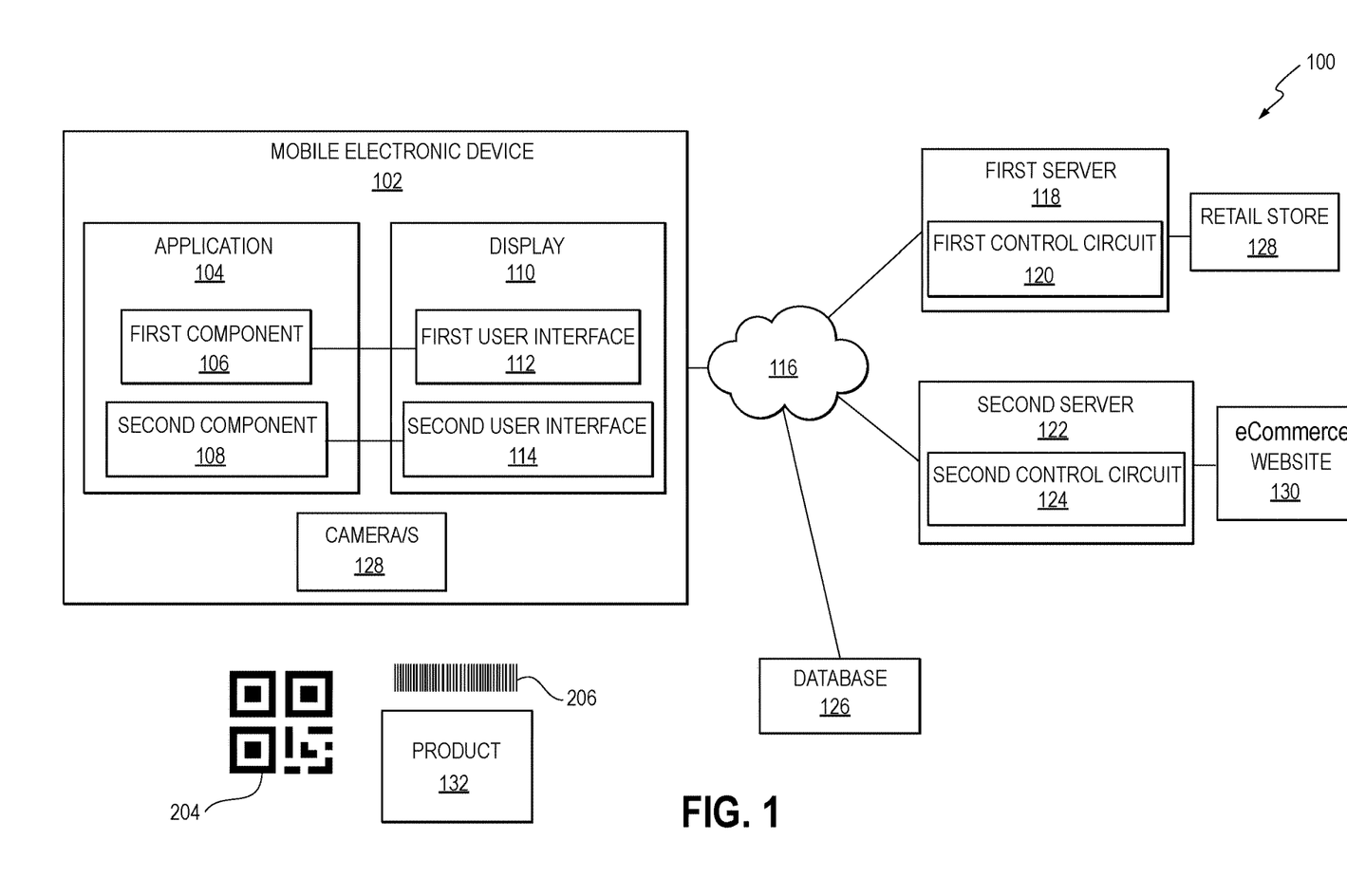
FIG. 1 illustrates a simplified block diagram of an exemplary system for user engagement with a retailer in accordance with some embodiments.
Figure 2A:
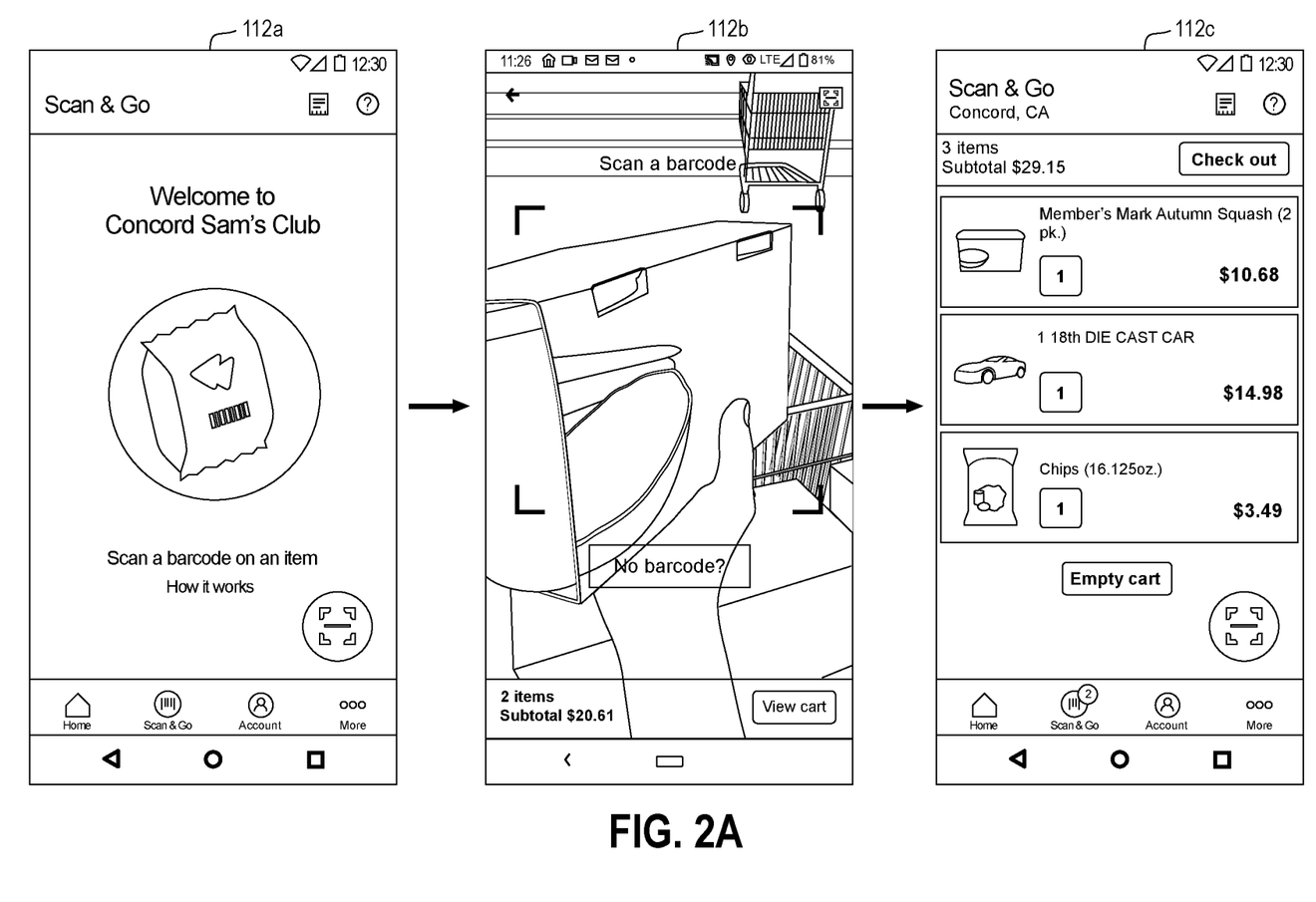
FIGS. 2A through 2G are illustrations of exemplary processes for user engagement with a retailer in accordance with several embodiments.
Figure 2B:
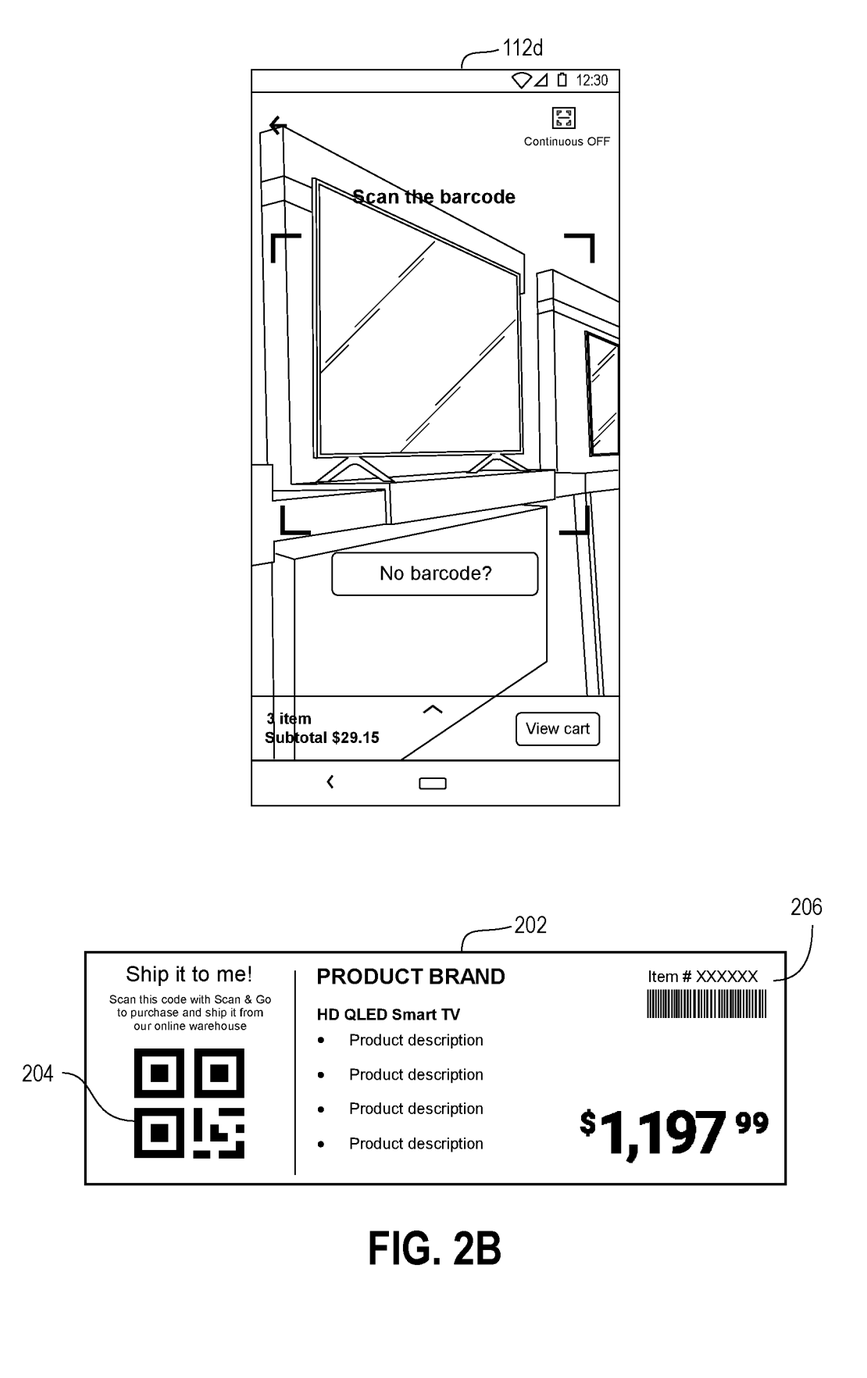
Figure 2C:
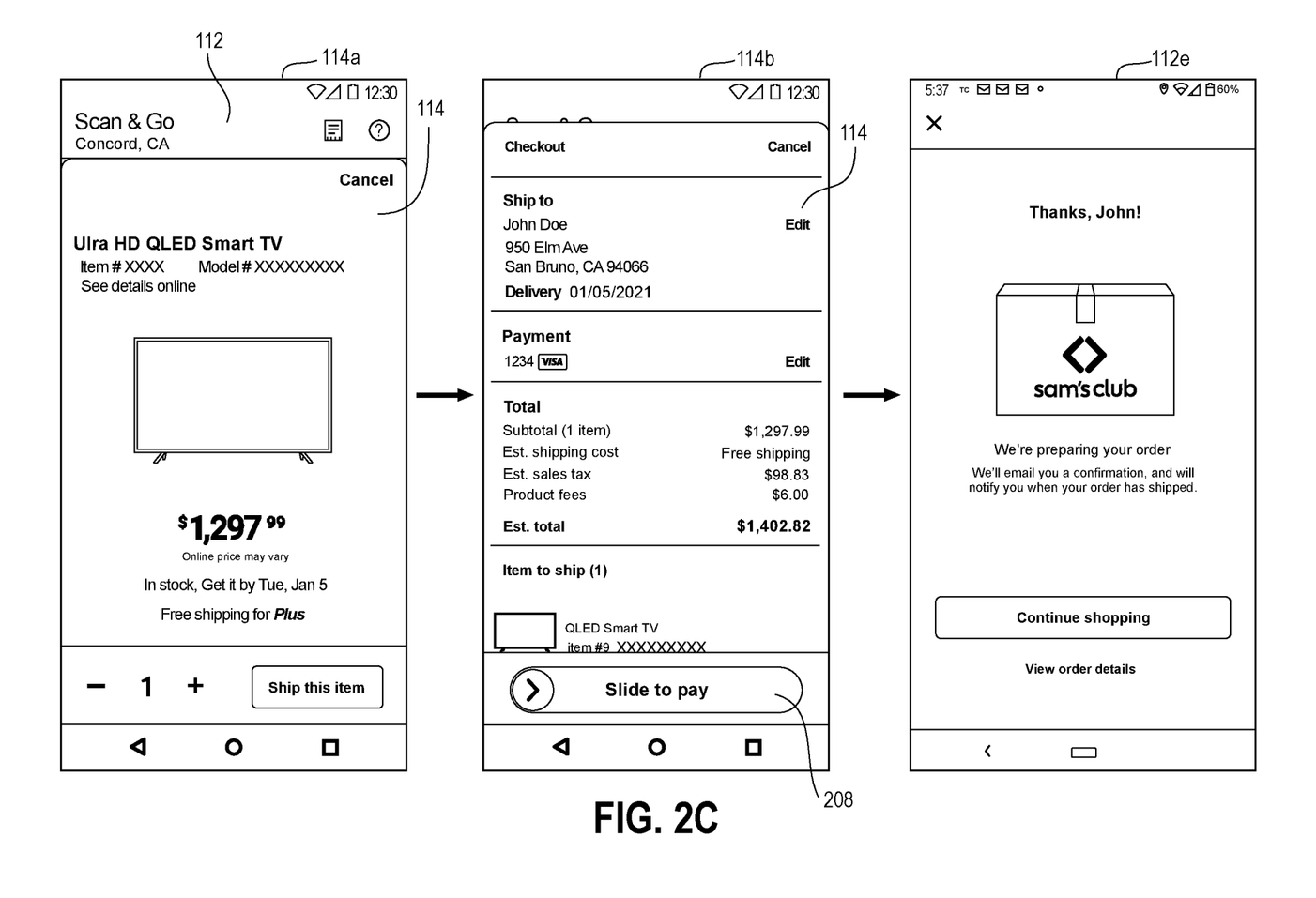
Figure 2D:
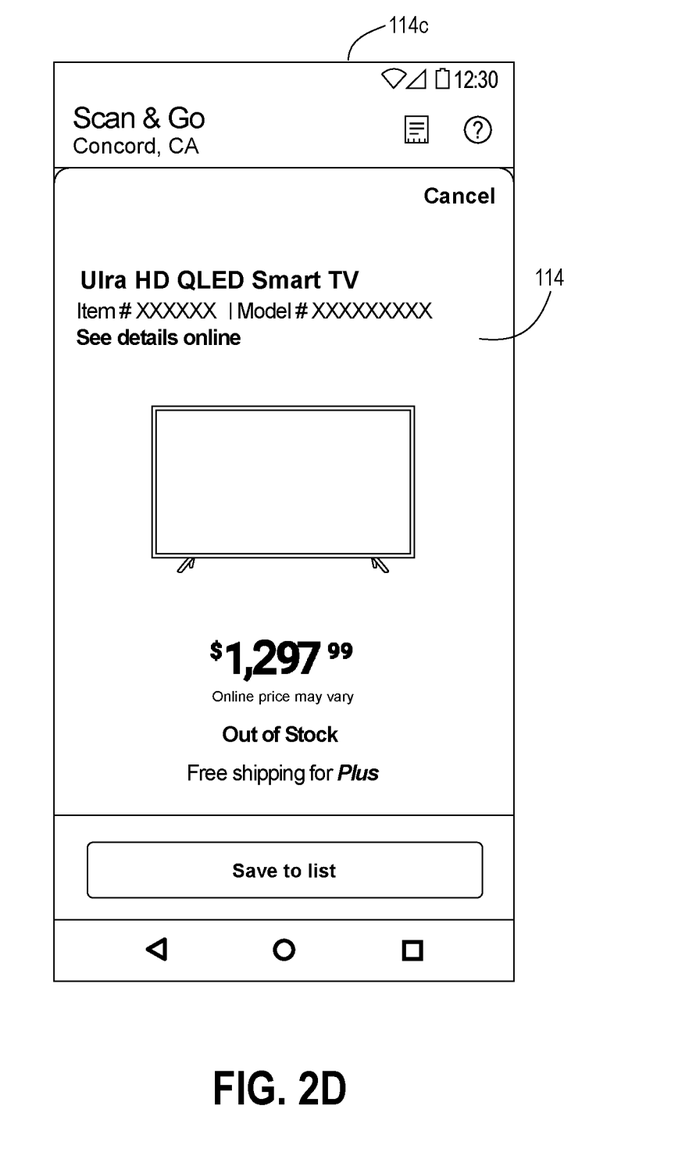
Figure 2E:
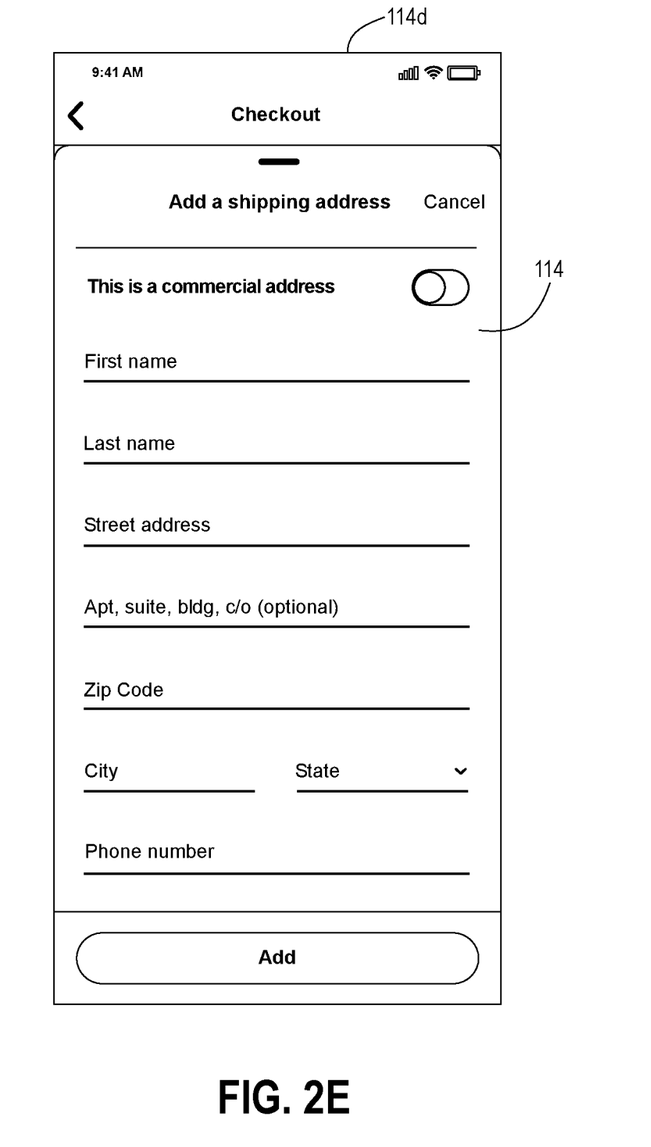
Figure 2F:
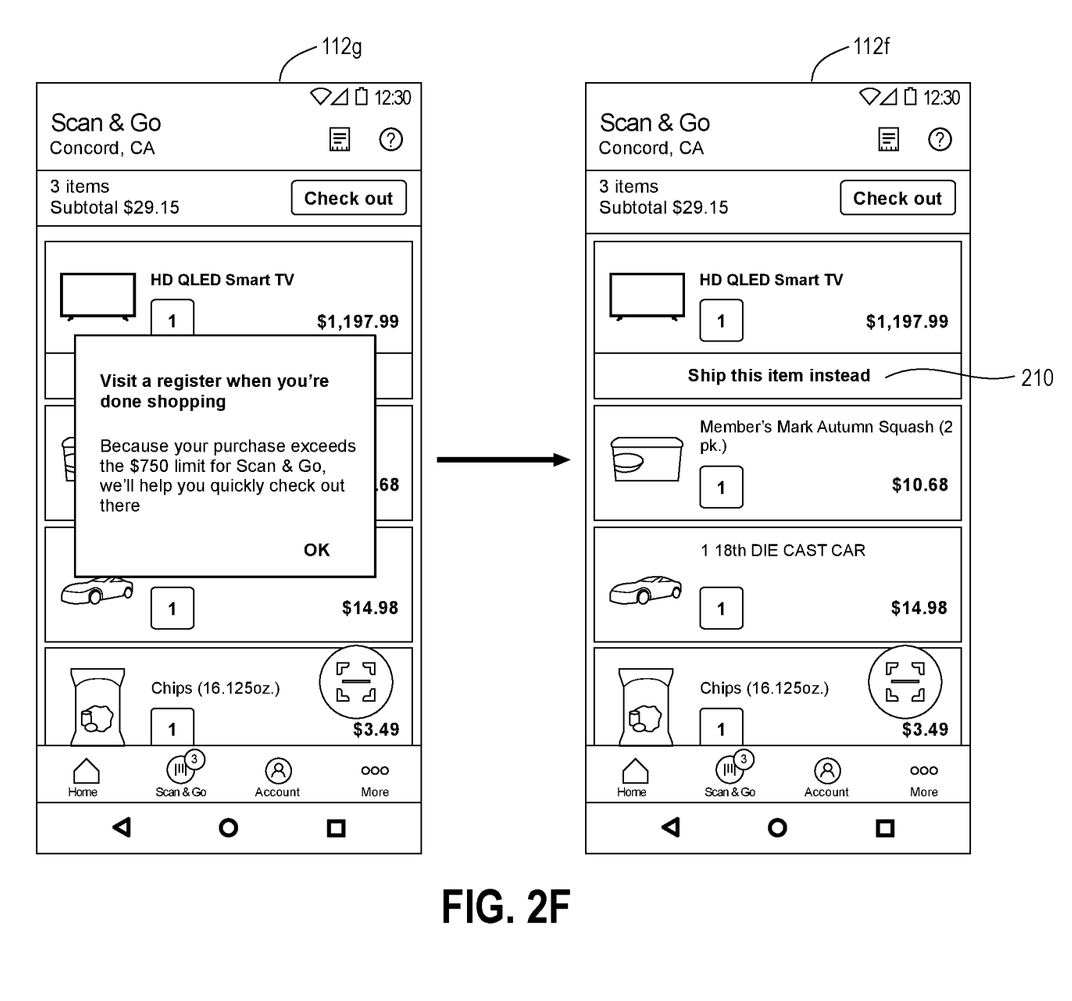
Figure 2G:
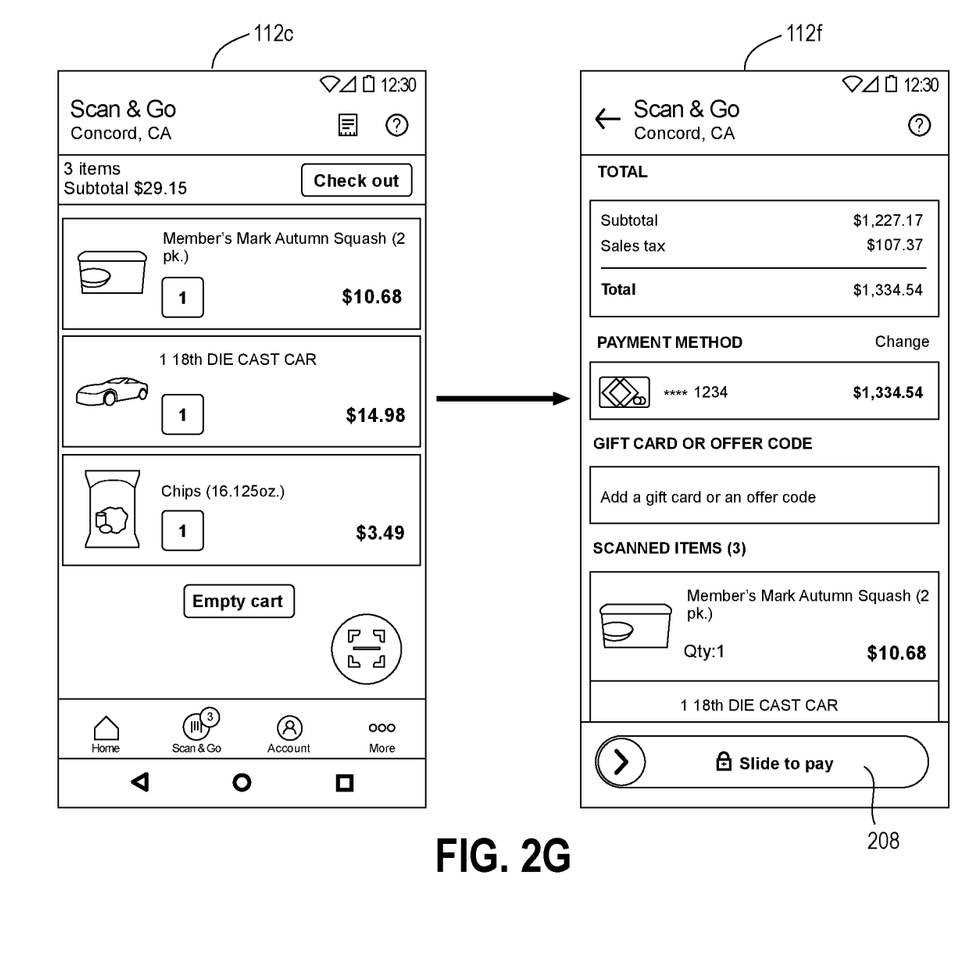
Figure 3:
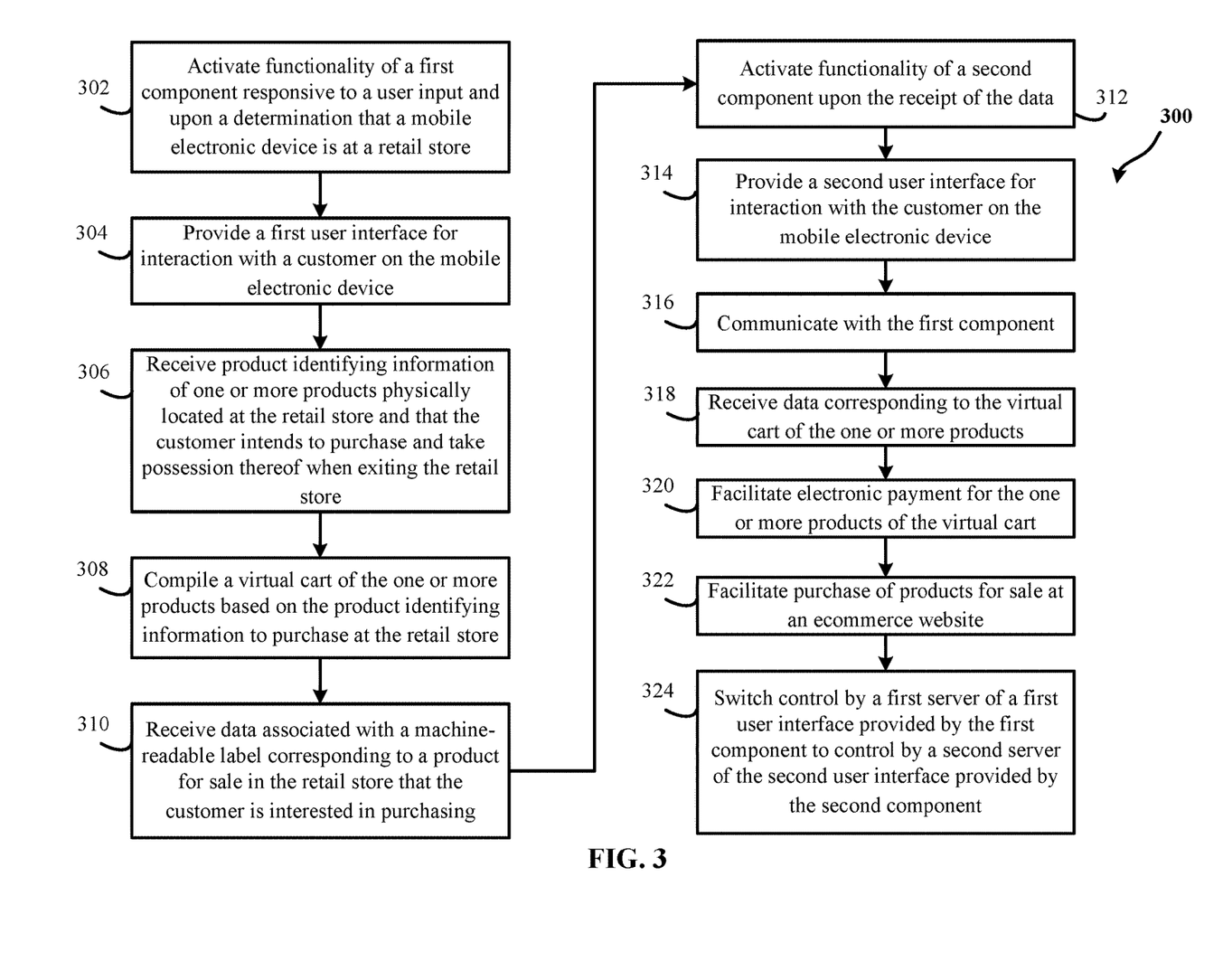
FIG. 3 shows a flow diagram of an exemplary process for user engagement with a retailer in accordance with some embodiments.

To illustrate at least some embodiments, FIGS. 1, 2A-2G, and 3 are concurrently described below. FIG. 1 illustrates a simplified block diagram of an exemplary system 100 for user engagement with a retailer in accordance with some embodiments. FIGS. 2A-2G are illustrations of an exemplary process for user engagement with a retailer in accordance with some embodiments. FIG. 3 shows a flow diagram of an exemplary process 300 for user engagement with a retailer in accordance with some embodiments. In some embodiments, the system 100 includes an application 104 including a set of computer program code configured to be executed by a mobile electronic device 102, e.g., by a control circuit or other local processor, associated with a customer of the retailer. In some embodiments, the set of computer program code is stored in a memory (not shown in FIG. 1). The memory may be integral to the mobile electronic device 102, or can be physically discrete (in whole or in part) from the mobile electronic device 102 and is configured to non-transitorily store the computer program code that, when executed by the mobile electronic device 102, cause the mobile electronic device 102 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory may be referred to as a non-transitory medium or non-transitory computer readable medium.

The application 104 can be executed by one or more mobile electronic devices 102 associated with customers of the retailer in concert with other software modules or applications (computer program code), or groups of applications, such as operating systems, locating applications (e.g., a mapping, GPS, etc. applications), two-factor authentication (TFA) applications, single sign on (SSO) applications, graphics processing/driver applications, security applications, etc. In some embodiments, the application 104 may be installed in one or more mobile electronic devices 102. By one approach, each application 104 can be locally installed in a memory associated with the mobile electronic device 102. In some embodiments, the application 104 is a dedicated application (e.g., an application specific to a retailer and/or specific to the functions described herein). In some embodiments, the application 104 is an application that performs the functions as described herein but also perform other functions in the operation of the mobile electronic device 102. In some embodiments, the application 104 is an add-on application installed on the mobile electronic device 102 and that cooperates with other application/s of the mobile electronic device 102, such as the operating system and works with the other application/s to provide the functionality described herein. For example, the application 104 is an add-on application that performs the functions to cause the display of and receive user inputs such as shown in FIGS. 2A-2G, and in doing so communicates with the operating system application of the mobile electronic device 102 to control at least a display 110 and user inputs, and uses communication transceivers and other input/output to communicate with other components in the system 100.

In some embodiments, the application 104 includes a first component 106 and a second component 108. In some embodiments, each component comprises respective computer program code configured to perform its respective functions. In some embodiments, each component can be referred to as a program module. In some embodiments, the first component 106 and the second component 108 are separate computer program code portions controlled by separate computer program code that interfaces or bridges the two components as needed. In some embodiments, the first component 106 and the second component 108 are part of the same computer program code such that separate interfacing code is not needed.

In some embodiments, each of the first component 106 and the second component 108 provide respective functions when executed by mobile electronic device 102. In some embodiments, when executed by a mobile electronic device 102, the first component 106 activates, at step 302, functionality of the first component 106 responsive to a user input and upon a determination that the mobile electronic device 102 is at a retail store 128. For example, the mobile electronic device 102 includes a navigation unit (e.g., Global Positioning Satellite (GPS), GLONASS, and/or the like) capable of determining a current location of the mobile electronic device 102. In some embodiments, a user input (e.g., a user/customer of the mobile electronic device 102 selecting an icon and/or a button on the mobile electronic device 102 corresponding to the application 104, a voice command received by a transceiver of the mobile electronic device 102, to name a few) initiating the application 104 may prompt the mobile electronic device 102 or a local processor/control circuit of the mobile electronic device 102 to determine the current location of the mobile electronic device 102 based on location data provided by the navigation unit. By one approach, the application 104 may determine that the customer is at a retail store of the retailer based on a comparison of the determined current location of the mobile electronic device 102 with one or more known (or stored) physical locations of retail stores of the retailer. By another approach, the application 104 may determine that the customer is at a retail store by determining that it is in range of and/or connected to a wireless network (e.g., a WiFi network) of the retail store.

In some embodiments, in response to the initiation of the application 104, the first component 106 provides, at step 304, a first user interface 202 for interaction with the customer on the mobile electronic device 102. In an illustrative non-limiting example, a welcome screen 112*a* in FIG. 2A is displayed on the display 110. In some embodiments, the first component 106 receives, at step 306, product identifying information of one or more products 132 physically located at a retail store 128 and that a customer intends to purchase and take possession thereof when exiting the retail store 128. For example, the first component 106 prompts a customer to scan a barcode as shown in a scan a barcode screen 112*b* of the first user interface 112 as shown in FIG. 2A. In some configurations, an image capturing device 118 (e.g., a camera) of the mobile electronic device 102 captures product identifying information of a product 132 physically located at the retail store 128. For example, the customer may decide to scan a barcode of the product shown in the barcode screen 112*b*. In some embodiments, the first component 106 compiles, at step 308, a virtual cart of one or more products based on product identifying information to purchase at the retail store 128. For example, a virtual cart screen 112*c* of the first user interface 112 may show 3 products that have been scanned by the customer at the retail store which the customer intends to purchase and take possession thereof when exiting the retail store 128 as shown in FIG. 2A.

In an illustrative non-limiting example, a customer may align a field of view of the image capturing device 118 with another product at the retail store 128. For example, as shown in FIG. 2B, the customer may align the field of view of the image capturing device 118 with a television as shown in a second scan a barcode screen 112*d*. In response, the first component 106 may prompt the customer to scan a product identifying information 206. For example, the product identifying information 206 may include one or more types of barcode such as code 39, code 128, interleaved 2 of 5, Universal Product Codes (UPC), International Article Number (EAN), and/or the like. In an illustrative non-limiting example, the product identifying information 206 may be located with a price tag 202 that is associated with a corresponding product as shown in FIG. 2B. In another example, the product identifying information 206 may be located on the product and/or on a box enclosing the product. In another illustrative non-limiting example, a machine-readable label 204 is located with the price tag 202, proximate the corresponding product and/or a representative illustration of the corresponding product (e.g., in a catalog, coupons, advertisements, flyers, etc.), and/or standalone in an area distinct and separate from a price tag 202. In some embodiments, a machine-readable label 204 includes pdf417, data matrix, quick response (QR) codes, a deep link (e.g., a type of link that sends users directly to an app instead of a website and/or a store, and/or the like. By one approach, the machine-readable label 204 is distinct and separate from the product identifying information 206.

In some embodiments, the first component 106 receives, at step 310, data associated with the machine-readable label 204 corresponding to a product for sale in the retail store 128 that the customer is interested in purchasing. In some embodiments, the product for sale in the retail store 128 that the customer is interested in purchasing is a particular product that the customer intends to not take possession thereof when exiting the retail store 128, or intends to not carry the product with the customer through the store such that the product can be picked up once shopping and checkout have been completed, or delivered to the customer's home at a later time.

In some embodiments, the data associated with the machine-readable label 204 corresponds to activation of a second component 108 and corresponds to the product for sale. For example, the image capture device 128 of the mobile electronic device 102 may optically read the machine-readable label 204. In some embodiments, when executed by the mobile electronic device 102, the second component 108 activates, at step 312, functionality of the second component 108 upon the receipt of the data. For example, as shown in FIG. 2C, the second component 108 causes a second user interface 114 to be overlayed on the first user interface 112. Thus, the activation of the functionality of the second component 108 may cause the second user interface 114 to overlay on the first user interface 112. The second component 108 may provide, at step 314, the second user interface 114 for interaction with the customer on the mobile electronic device 102. For example, upon the scanning of the machine-readable label 204, a product detail screen 114*a* of the second user interface 114 is displayed on the display 110. In some embodiments, in the product detail screen 114*a* the customer is prompted to ship the product, make a selection of desired characteristic of the product (e.g., size, color, dimension, design, among other possible characteristics that the particular product may have), increase quantity of the product to be ordered, open a live chat session, save the product information for later retrieval, and/or request for an in-store associate to meet you at the location of the product, to name a few. In some embodiments, after the customer's selection to ship the product/item, the second component 108 updates the second user interface 114 to display a checkout screen 114*b*. For example, at the checkout screen 114*b*, the customer may slide a button 208 to pay for the product associated with the machine-readable label 204. In some embodiments, after sliding the button 208, the customer interaction with the second user interface 114 terminates and/or the first component 106 takes the control back from the second component 108 and updates the display 110 to show a thank you screen 112*e* of the first user interface 112. In some embodiments, the thank you screen 112*e* prompts the customer to continue shopping and/or view details of the just completed order. In some embodiments, the customer selects to continue shopping. For example, in response the selection to continue shopping, the first component 106 updates the display 110 to show the virtual cart screen 112*c* of the first user interface 112. In some embodiments, after the termination of the customer interaction with the second user interface 114, the display 110 again displays the user interface that was previously shown prior to the reading of the machine-readable label 204, which, in this illustrative non-limiting example, was the virtual cart screen 112*c* of the first user interface 112 as shown in FIG. 2G. In some embodiments, in response to the selection to proceed to check out, the first user interface 112 is updated by the first component 106 to display a checkout screen 112*f* of the first user interface 112. In some embodiments, after the customer selecting and/or sliding the button 208 to pay for the product associated with the product identifying information 206, the first component 106 deactivates the application 104. In such an embodiment, the customer may reactivate the application 104 as long as the customer is at the retail store 128.

In some embodiments, the system 100 includes a first server 118 including a first control circuit 120 and communicatively coupled to the application 104 via the network 116. The first server 118 may, at step 316, communicate with the first component 106. For example, execution of and/or operation of the functionality of the first component 106 is at least in part controlled by the first server 118. Thus, the interaction of the customer with the first user interface 112 may correspond to the customer interacting with the first server 118. In some embodiments, the first server 118 receives, at step 318, data corresponding to the virtual cart of the one or more products (e.g., the virtual cart shown in the virtual cart screen 112c of FIG. 2A). In some embodiments, the first server 118 facilitates, at step 320, electronic payment for the one or more products of the virtual cart (e.g., the checkout screen 112f of FIG. 2G).

In some embodiments, the system 100 includes a second server 122 including a second control circuit 124 and communicatively coupled to the application 104 via the network 116. The second server 122 may, at step 322, facilitate purchase of products for sale at an ecommerce website 130. In some embodiments, at step 324, the second server 122 switches, upon activation of the second component 108, control by the first server 118 of the first user interface 112 provided by the first component 106 to control by the second server 122 of the second user interface 114 provided by the second component 108. For example, the scanning and/or the reading of the machine-readable label 204 triggers the first server 118 to relinquish control and/or interaction with the customer to the second server 122. In some embodiments, the scanning and/or the reading of the machine-readable label 204 triggers the second component 108 to activate and/or establish communication with the second server 122. For example, execution of and/or operation of the functionality of the second component 108 is at least in part controlled by the second server 122. Thus, the interaction of the customer with the second user interface 114 may correspond to the customer interacting with the second server 122. In some embodiments, the activation of the functionality of the second component 108 causes the functionality of the first component 106 to be at least suspended, paused, deactivated, and/or on hold. One of the benefits and/or advantages of overlaying the second user interface 114 on the first user interface 112 is the seamless transition of control from the first server 118 to the second server 122. From the perspective of the customer, the customer can choose to seamlessly decide to ship a product to a location while shopping at a retail store 128. For example, while browsing and/or shopping at the retail store 128, the customer may be prompted about a product and decide, for whatever reason it may be (e.g., the product is too bulky, not enough storage space in a vehicle used by the customer, gifting the product to another person, to name a few) to ship the product without being interrupted in its current shopping activity. Another one of the benefits and/or advantages is the ability to integrate into a single user interface various capabilities and/or services provided by a number of servers used by a retailer to provide services to its customers in a seamless fashion.

In another illustrative non-limiting example, after the scanning and/or reading of the machine-readable label 204, the second component 108 updates the second user interface 114 to show an out of stock screen 114c of FIG. 2D instead of the product detail screen 114a of FIG. 2C. In the out of stock screen 114c, the customer may be prompted by the second component 108 to save product detail information of the product associated with the machine-readable label 204 for a later access. In some embodiments, in a determination by the second server 122 that the customer does not have a default shipping location stored with its profile, the second component 108 may update the second user interface 114 to display an add shipping address screen 114d shown in FIG. 2E and prompt the customer to provide a shipping address. In some embodiments, in response to a user input indicating to add the shipping address provided in the add shipping address screen 114d, the second component 108 may update the second user interface 114 to display the add shipping address screen 114d in order to complete the shipping of the product associated with the scanned and/or read machine-readable label 204.

In another illustrative non-limiting example, instead of scanning the machine-readable label 204, the customer scanned the product identifying information 206 it is interested in purchasing at the retail store 128. In response to the scanning of the product identifying information 206, the first server 118 may determine that the customer needs to visit a register station (e.g., the allowed total price amount of products in the virtual cart exceeds the amount allowed, an alcoholic product is being purchased, and/or any one or more reason that an associate may be required to complete the customer's purchase transaction) as shown in a visit a register screen 112g of FIG. 2F. In some embodiments, the first server 118 determines that the corresponding product associated with the scanned product identifying information 206 can be shipped. In such an embodiment, the first server 118 causes the first component 106 to provide a user-clickable link 210 on the checkout screen 112f as shown in FIG. 2F. In some embodiments, a selection of the user-clickable link 210 triggers the second component 108 to activate and/or establish communication with the second server 122. In some embodiments, the selection of the user-clickable link 210 corresponds to the scanning and/or reading of the machine-readable label 204. For example, the selection of the user-clickable link 210 causes the second component 108 to update the display 110 to show the product detail screen 114a of the second user interface 114 as shown in FIG. 2C.

In some embodiments, a database 126 is coupled to the second server 122 and stores second product identifying information associated with products for sale at an ecommerce website 130. In some embodiments, one of the functionality of the second component 108 is to transmit to the second server 122 via a communication network 116 the data associated with the machine-readable label 204. In some embodiments, the second server 122 translates the data associated with the machine-readable label 204 into a corresponding product identifying information associated with the product that the machine-readable label 204 is associated with. In some embodiments, the second server 122 determines that the corresponding product identifying information is one of the stored second product identifying information associated with the products for sale at the ecommerce website 130 based on an access to the database 126. In some embodiments, the second server 122 cause, in response to the determination that the corresponding product identifying information is stored in the database 126, the second user interface to indicate that the product is available to ship to a location selected by the customer as shown in an illustrative non-limiting example of the product detail screen 114a in FIG. 2C.

In some embodiments, the second server 122 causes the second component 108 to maintain the overlay of the second user interface 114 on the first user interface 112 until a second user input is received corresponding to at least one of a request to ship the product to the location and a termination of the customer interaction with the second user interface. In an illustrative non-limiting example, the selection and/or the sliding of the button 208 of FIG. 2C to pay for the product associated with the machine-readable label 204 corresponds to the customer terminating the current customer interaction. In response, the second server 122 may switch the control to the first server 118 of the first user interface 112 provided by the first component 106 in response to the second user input. In some embodiments, the switching of control is exemplified in an illustrative non-limiting example of the transition from the checkout screen 114*b* of the second user interface 114 to the thank you screen 112*e* of the first user interface 112.

In some embodiments, the second server 122 determines that the customer has left the retail store 128. In such embodiment, the second server 122 causes the second component 108 to maintain the overlay of the second user interface 114 on the first user interface 112 until a second user input is received corresponding to at least one of a request to ship the product to the location and a termination of the customer interaction with the second user interface 114. In some embodiments, the termination of the customer interaction with the second user interface 114 triggers the second server 122 to deactivate control by the second server 122 of the second user interface 114. In an illustrative non-limiting example, the customer may decide to leave the retail store 128 without completing and/or terminating the customer interaction with the second user interface 114. In such an example, the customer may select the icon and/or the button on the mobile electronic device 102 corresponding to the application 104 at a place away and/or distant from the retail store 128. In response, the second component 108 may recall the second user interface 114 that was previously displayed on the display 110 prior to the customer and enable the customer to complete the purchase and/or shipment of the product associated with the machine-readable label 204. In some embodiments, after the customer terminates the customer interaction with the second user interface 114, the second component 108 remains active. By one approach, the second user interface 114 remains overlayed on the first user interface 112. By another approach, the second user interface 114 is no longer overlayed on the first user interface 112. In some embodiments, in either approaches, the second server 122 remains at least in part in control of the interface interacted by the customer and/or the application 104.

In some embodiments, the data associated with the machine-readable label 204 corresponds to a location inside the retail store 128. For example, the second server 122 may transmit a message indicating that the customer is requesting an assistance from an in-store associate upon the receipt of the data and/or a second user input via the second user interface 114. For example, the customer may have a question regarding a product and would like to talk and/or request assistance from an in-store associate regarding the product. In such an example, the scanning and/or the reading of the machine-readable label 204 activates the second component 108 and places and/or make available in the second user interface 114 a button and/or a clickable link that when selected, automatically transmits a location inside the retail store 128 to an electronic device of an in-store associate indicating where to locate the customer at the retail store 128. In some embodiments, the location includes a store coordinate location corresponding to a location that the customer may be found inside the retail store 128. In some embodiments, the second server 122 causes the second user interface 114 to display on the display 110 a notification viewable by the customer indicating that the in-store associate is on its way to the customer.

In some embodiments, the data associated with the machine-readable label 204 corresponds to a trigger by the second server 122 to initiate a chat session with a retailer associate via the second user interface 114. In some embodiments, the retailer associate includes an in-store associate, a remote associate, any individual associated with the retailer to respond to customers communication via the chat session, and/or a computer-based platform (e.g., a GURU platform and/or the like) that uses natural language processing to perform queries and commands to return information to the customer. In some embodiments, the second server 122 automatically provides a corresponding product identifying information associated with the data to the retailer associate such that the retailer associate is automatically provided relevant product data associated with the corresponding product identifying information. For example, the retailer associate may automatically know the product that the customer would like to discuss in the chat session.

In some embodiments, the data associated with the machine-readable label 204 corresponds to providing data regarding stock and/or inventory status of the corresponding product associated with the machine-readable label 204 and/or corresponds to data to upsale the corresponding product. In some embodiments, the application 104 may further include additional components communication with and/or controlled by other servers used and/or operated by the retailer.

In some embodiments, the first server 118, the second server 122, the database 126, the mobile electronic device 102, may communicate with one another via the communication network 116. In some embodiments, the communication network 116 includes wired and/or wired communication network, Internet, cloud, and/or any communication networks that enable one electronic device to communication with another electronic device. In some embodiments, the database 126 includes one or more memories and/or memory devices capable of storing electronic data retrieval by one or more electronic devices. In some embodiments, the one or more memories and/or memory devices include random access memory (RAM), read only memory (ROM), solid state devices, hard drives, and/or the like.

Figure 4:
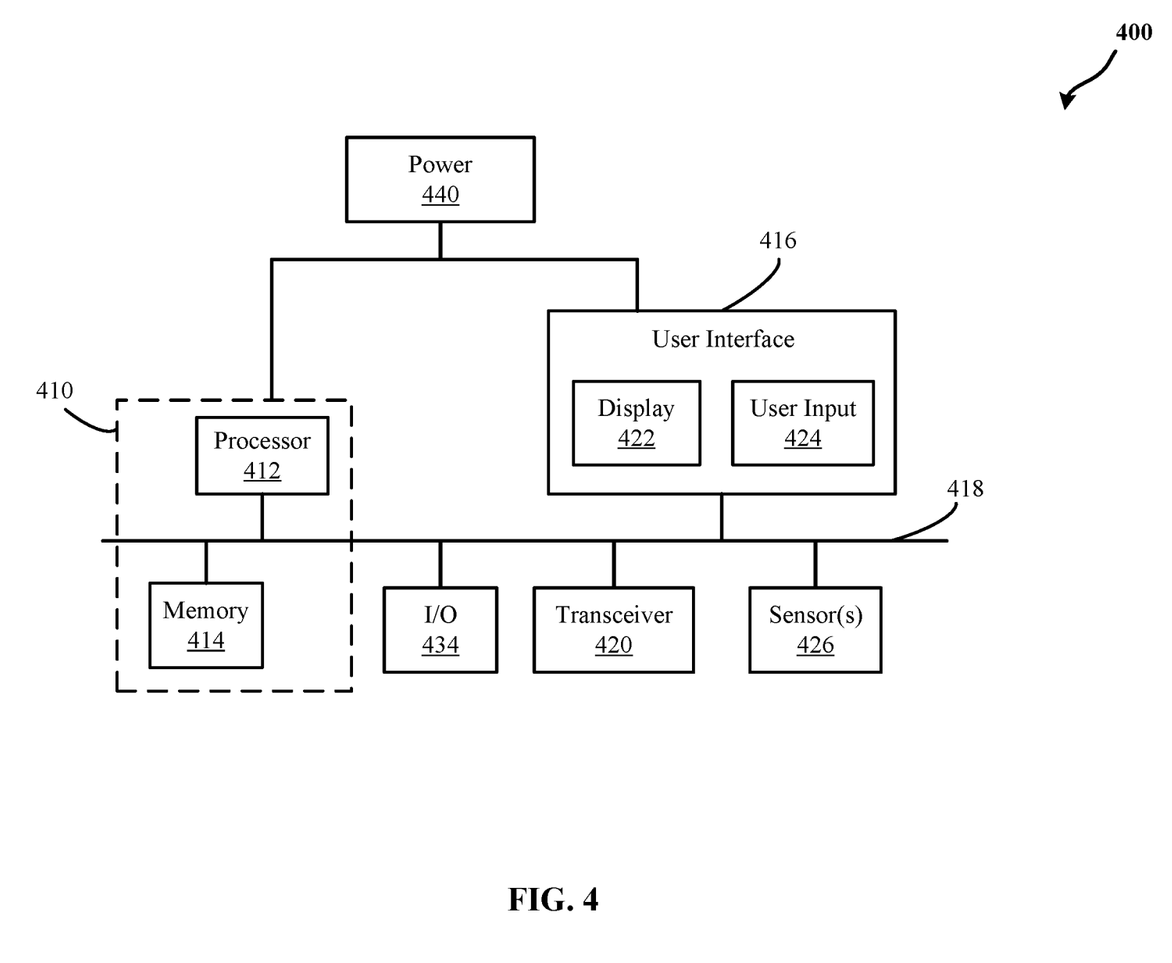
FIG. 4 illustrates an exemplary system for use in implementing methods, techniques, devices, apparatuses, systems, servers, sources for user engagement with a retailer in accordance with several embodiments.

Further, the circuits, circuitry, systems, devices, processes, methods, techniques, functionality, services, servers, sources and the like described herein may be utilized, implemented and/or run on many different types of devices and/or systems. FIG. 4 illustrates an exemplary system 400 that may be used for implementing any of the components, circuits, circuitry, systems, functionality, apparatuses, processes, or devices of the system 100 of FIG. 1, the method 300 of FIG. 3, and/or other above or below mentioned systems or devices, or parts of such circuits, circuitry, functionality, systems, apparatuses, processes, or devices. For example, the system 400 may be used to implement some or all of the system for user engagement with a retailer, including the first server 118, the second server 122, and the mobile electronic device 102, and/or other such components, circuitry, functionality and/or devices. However, the use of the system 400 or any portion thereof is certainly not required.

By way of example, the system 400 may comprise a processor module (or a control circuit) 412, memory 414, and one or more communication links, paths, buses or the like 418. Some embodiments may include one or more user interfaces 416, and/or one or more internal and/or external power sources or supplies 440. The control circuit 412 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 412 can be part of control circuitry and/or a control system 410, which may be implemented through one or more processors with access to one or more memory 414 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 400 may be used to implement one or more of the above or below, or parts of, components, circuits, systems, processes and the like. For example, the system 400 may implement the system 100 for user engagement with a retailer with the first control circuit 120 and/or the second control circuit 124 and/or the mobile electronic device 102 being the control circuit 412.

The user interface 416 can allow a user to interact with the system 500 and receive information through the system. In some instances, the user interface 416 includes a display 422 and/or one or more user inputs 424, such as buttons, touch screen, track ball, keyboard, mouse, etc., which can be part of or wired or wirelessly coupled with the system 400. Typically, the system 400 further includes one or more communication interfaces, ports, transceivers 420 and the like allowing the system 400 to communicate over a communication bus, a distributed computer and/or communication network (e.g., a local area network (LAN), the Internet, wide area network (WAN), etc.), communication link 518, other networks or communication channels with other devices and/or other such communications or combination of two or more of such communication methods. Further the transceiver 420 can be configured for wired, wireless, optical, fiber optical cable, satellite, or other such communication configurations or combinations of two or more of such communications. Some embodiments include one or more input/output (I/O) interface 434 that allow one or more devices to couple with the system 400. The I/O interface can be substantially any relevant port or combinations of ports, such as but not limited to USB, Ethernet, or other such ports. The I/O interface 434 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 426 to provide information to the system and/or sensor information that is communicated to another component, such as the first server 118, the first control circuit 120, the second server 122, the second control circuit 124, the database 126, the mobile electronic device 102, the display 110, the camera/s 128, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 400 comprises an example of a control and/or processor-based system with the control circuit 412. Again, the control circuit 412 can be implemented through one or more processors, controllers, central processing units, logic, software and the like. Further, in some implementations the control circuit 412 may provide multiprocessor functionality.

The memory 414, which can be accessed by the control circuit 412, typically includes one or more processor readable and/or computer readable media accessed by at least the control circuit 412, and can include volatile and/or nonvolatile media, such as RAM, ROM, EEPROM, flash memory and/or other memory technology. Further, the memory 414 is shown as internal to the control system 410; however, the memory 414 can be internal, external or a combination of internal and external memory. Similarly, some or all of the memory 414 can be internal, external or a combination of internal and external memory of the control circuit 412. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 414 can store code, software, executables, scripts, data, content, lists, programming, programs, log or history data, user information, customer information, product information, and the like. While FIG. 4 illustrates the various components being coupled together via a bus, it is understood that the various components may actually be coupled to the control circuit and/or one or more other components directly.

In some embodiments, the system 400 is implemented as the mobile electronic device 102 wherein the application 104 (including the first component 106 and the second component 108) is stored in the memory 414. The processor 412 (control circuit) is configured to execute the application 104 and use the other components (such as the user interface 416) to provide the functions described herein. In embodiments where the application 104 is an add-on application, the memory 414 also stores operating system program code that functions together with the application 104. In embodiment where the application 104 is integral with the operating system, the memory stores the application 104/operating system program code.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for user engagement with a retailer, the system comprising:
an application comprising a set of computer program code configured to be executed by a mobile electronic device associated with a customer of the retailer, the application comprising a first component and a second component,
wherein when executed by the mobile electronic device, the first component is configured to:

activate functionality of the first component responsive to a user input and upon a determination that the mobile electronic device is at a retail store;

provide a first user interface for interaction with the customer on the mobile electronic device;

receive product identifying information of one or more products physically located at the retail store and that the customer intends to purchase and take possession thereof when exiting the retail store;

compile a virtual cart of the one or more products based on the product identifying information to purchase at the retail store, and receive data associated with a machine-readable label corresponding to a product for sale in the retail store that the customer is interested in purchasing, the data corresponding to activation of the second component and corresponding to the product for sale, the machine-readable label configured to be optically read by an image capture device of the mobile electronic device;

wherein when executed by the mobile electronic device, the second component is configured to:

activate functionality of the second component upon the receipt of the data; and provide a second user interface for interaction with the customer on the mobile electronic device;

a first server comprising a first control circuit and communicatively coupled to the application and configured to:

communicate with the first component;

receive data corresponding to the virtual cart of the one or more products;

facilitate electronic payment for the one or more products of the virtual cart; and a second server comprising a second control circuit and communicatively coupled to the application and configured to:

facilitate purchase of products for sale at an ecommerce website; and switch, upon the activation of the second component, control by the first server of the first user interface provided by the first component to control by the second server of the second user interface provided by the second component, wherein the activation of the functionality of the second component causes the second user interface to overlay on the first user interface, and wherein a customer interaction with the second user interface corresponds to the customer interacting with the second server;

cause the second component to maintain the overlay of the second user interface on the first user interface until a second user input is received corresponding to at least one of a request to ship the product to the location and a termination of the customer interaction with the second user interface; and switch the control to the first server of the first user interface provided by the first component in response to the second user input.

2. The system of claim 1, wherein the machine-readable label is separate and distinct from the product identifying information of the one or more products.

3. The system of claim 1, wherein the activation of the functionality of the second component suspends the functionality of the first component.

4. The system of claim 1, further comprising a database coupled to the second server and configured to store second product identifying information associated with products for sale at the ecommerce website, wherein the second server is further configured to:

translate the data associated with the machine-readable label into a corresponding product identifying information associated with the product;

determine that the corresponding product identifying information is one of the stored second product identifying information associated with the products for sale at the ecommerce website based on an access to the database; and cause, in response to the determination that the corresponding product identifying information is stored in the database, the second user interface to indicate that the product is available to ship to a location selected by the customer.

5. The system of claim 4, wherein the second server is further configured to:

determine that the customer has left the retail store; and cause the second component to maintain the overlay of the second user interface on the first user interface until a second user input is received corresponding to at least one of a request to ship the product to the location and a termination of the customer interaction with the second user interface, wherein the termination of the customer interaction with the second user interface triggers the second server to deactivate control by the second server of the second user interface.

6. The system of claim 1, further comprising the machine-readable label comprising a QR code.

7. The system of claim 1, wherein the data further corresponds to a location inside the retail store, and wherein the second server is further configured to:

transmit a message indicating that the customer is requesting an assistance from an in-store associate upon the receipt of the data and a second user input via the second user interface; and cause the second user interface to display a notification viewable by the customer indicating that the in-store associate is on its way to the location.

8. The system of claim 1, wherein the second server is further configured to:

initiate a chat session with a retailer associate via the second user interface; and automatically provide a corresponding product identifying information associated with the data to the retailer associate such that the retailer associate is automatically provided relevant product data associated with the corresponding product identifying information.

9. The system of claim 1, wherein the product for sale in the retail store that the customer is interested in purchasing is a particular product that the customer intends to not take possession thereof when exiting the retail store.

10. A method for user engagement with a retailer, the method comprising:

activating, by a first component of an application comprising a set of computer program code configured to be executed by a mobile electronic device associated with a customer of the retailer, functionality of the first component responsive to a user input and upon a determination that the mobile electronic device is at a retail store;

providing, by the first component, a first user interface for interaction with the customer on the mobile electronic device;

receiving, by the first component, product identifying information of one or more products physically located at the retail store and that the customer intends to purchase and take possession thereof when exiting the retail store;

compiling, by the first component, a virtual cart of the one or more products based on the product identifying information to purchase at the retail store, receiving, by the first component, data associated with a machine-readable label corresponding to a product for sale in the retail store that the customer is interested in purchasing, the data corresponding to activation of the second component and corresponding to the product for sale, the machine-readable label configured to be optically read by an image capture device of the mobile electronic device;

activating, by a second component of the application, functionality of the second component upon the receipt of the data;

providing, by the second component, a second user interface for interaction with the customer on the mobile electronic device;

communicating, by a first server comprising a first control circuit and communicatively coupled to the application, with the first component;

receiving, by the first server, data corresponding to the virtual cart of the one or more products;

facilitating, by the first server, electronic payment for the one or more products of the virtual cart;

facilitating, by a second server comprising a second control circuit and communicatively coupled to the application, purchase of products for sale at an ecommerce website; and switching, by the second server and upon the activation of the second component, control by the first server of the first user interface provided by the first component to control by the second server of the second user interface provided by the second component, wherein the activation of the functionality of the second component causes the second user interface to overlay on the first user interface, and wherein a customer interaction with the second user interface corresponds to the customer interacting with the second server;

causing the second component to maintain the overlay of the second user interface on the first user interface until a second user input is received corresponding to at least one of a request to ship the product to the location and a termination of the customer interaction with the second user interface; and switching the control to the first server of the first user interface provided by the first component in response to the second user input.

11. The method of claim 10, wherein the machine-readable label is separate and distinct from the product identifying information of the one or more products.

12. The method of claim 10, wherein the activation of the functionality of the second component suspends the functionality of the first component.

13. The method of claim 10, further comprising:
translating, by the second server, the data associated with the machine-readable label into a corresponding product identifying information associated with the product;
determining, by the second server, that the corresponding product identifying information is one of the stored second product identifying information associated with the products for sale at the ecommerce website based on an access to a database, wherein the database is coupled to the second server and stores second product identifying information associated with products for sale at the ecommerce website; and
causing, by the second server, the second user interface to indicate that the product is available to ship to a location selected by the customer in response to the determination that the corresponding product identifying information is stored in the database.

14. The method of claim 13, further comprising:
determining, by the second server, that the customer has left the retail store; and
causing the second component to maintain, by the second server, the overlay of the second user interface on the first user interface until a second user input is received corresponding to at least one of a request to ship the product to the location and a termination of the customer interaction with the second user interface, wherein the termination of the customer interaction with the second user interface triggers the second server to deactivate control by the second server of the second user interface.

15. The method of claim 10, wherein the data further corresponds to a location inside the retail store, and further comprising:
transmitting, by the second server, a message indicating that the customer is requesting an assistance from an in-store associate upon the receipt of the data and a second user input via the second user interface; and
causing, by the second server, the second user interface to display a notification viewable by the customer indicating that the in-store associate is on its way to the location.

16. The method of claim 10, further comprising:
initiating, by the second server, a chat session with a retailer associate via the second user interface; and
automatically providing, by the second server, a corresponding product identifying information associated with the data to the retailer associate such that the retailer associate is automatically provided relevant product data associated with the corresponding product identifying information.

* * * * *